(12) United States Patent
Park et al.

(10) Patent No.: US 11,919,984 B2
(45) Date of Patent: Mar. 5, 2024

(54) BLENDS OF CROSSLINKING AGENTS FOR FLUOROELASTOMERS

(71) Applicant: 3M INNOVATIVE PROPERTIES COMPANY, St. Paul, MN (US)

(72) Inventors: Jiyoung Park, Woodbury, MN (US); Tatsuo Fukushi, Woodbury, MN (US); Miguel A. Guerra, Woodbury, MN (US); Chetan P. Jariwala, Woodbury, MN (US); Klaus Hintzer, Kastl (DE)

(73) Assignee: 3M Innovative Properties Company, St. Paul, MN (US)

( * ) Notice: Subject to any disclaimer, the term of this patent is extended or adjusted under 35 U.S.C. 154(b) by 748 days.

(21) Appl. No.: 16/969,766

(22) PCT Filed: Feb. 13, 2019

(86) PCT No.: PCT/IB2019/051150
§ 371 (c)(1),
(2) Date: Aug. 13, 2020

(87) PCT Pub. No.: WO2019/159066
PCT Pub. Date: Aug. 22, 2019

(65) Prior Publication Data
US 2021/0002400 A1 Jan. 7, 2021

Related U.S. Application Data

(60) Provisional application No. 62/632,013, filed on Feb. 19, 2018.

(51) Int. Cl.
| | |
|---|---|
| *B29C 48/00* | (2019.01) |
| *B29C 48/09* | (2019.01) |
| *B29C 48/91* | (2019.01) |
| *B29K 55/00* | (2006.01) |
| *B29K 105/24* | (2006.01) |
| *C08F 214/22* | (2006.01) |
| *C08F 214/28* | (2006.01) |
| *C08K 5/053* | (2006.01) |
| *C08K 5/06* | (2006.01) |
| *C08K 5/435* | (2006.01) |
| *B29K 23/00* | (2006.01) |
| *B29K 105/00* | (2006.01) |
| *C08K 3/22* | (2006.01) |
| *C08K 5/50* | (2006.01) |

(52) U.S. Cl.
CPC .......... *C08F 214/28* (2013.01); *B29C 48/022* (2019.02); *B29C 48/09* (2019.02); *B29C 48/9105* (2019.02); *C08F 214/22* (2013.01); *C08K 5/053* (2013.01); *C08K 5/06* (2013.01); *C08K 5/435* (2013.01); *B29K 2023/14* (2013.01); *B29K 2055/00* (2013.01); *B29K 2105/0005* (2013.01); *B29K 2105/0085* (2013.01); *B29K 2105/246* (2013.01); *C08F 2810/20* (2013.01); *C08K 2003/222* (2013.01); *C08K 5/50* (2013.01); *C08K 2201/014* (2013.01)

(58) Field of Classification Search
CPC combination set(s) only.
See application file for complete search history.

(56) References Cited

U.S. PATENT DOCUMENTS

| | | | |
|---|---|---|---|
| 2,691,043 A | 10/1954 | Husted | |
| 2,803,656 A | 8/1957 | Ahlbrecht | |
| 3,829,466 A * | 8/1974 | Staffe | D21H 17/58 252/8.62 |
| 4,175,096 A * | 11/1979 | Reitz | C08G 65/00 564/96 |
| 4,233,421 A | 11/1980 | Worm | |
| 4,338,237 A | 7/1982 | Sulzbach | |
| 4,358,559 A | 11/1982 | Holcomb | |
| 4,912,171 A | 3/1990 | Grootaert | |
| 5,086,123 A | 2/1992 | Guenthner | |
| 5,216,085 A | 6/1993 | Guenthner | |
| 5,262,490 A | 11/1993 | Kolb | |
| 5,266,650 A | 11/1993 | Guerra | |
| 5,284,611 A | 2/1994 | Grootaert | |
| 5,285,002 A | 2/1994 | Grootaert | |
| 5,384,374 A | 1/1995 | Guerra | |
| 5,478,652 A | 12/1995 | Grootaert | |
| 5,491,261 A | 2/1996 | Haniff | |
| 5,500,042 A * | 3/1996 | Grootaert | C08K 5/50 156/308.6 |
| 5,591,804 A | 1/1997 | Coggio | |
| 5,681,881 A | 10/1997 | Jing | |
| 5,882,466 A | 3/1999 | Grootaert | |
| 5,929,169 A | 7/1999 | Jing | |
| 6,759,129 B2 | 7/2004 | Fukushi | |
| 8,907,120 B2 | 12/2014 | Yang | |
| 2006/0029812 A1 | 2/2006 | Jing | |

(Continued)

FOREIGN PATENT DOCUMENTS

| | | |
|---|---|---|
| CN | 107109012 A | 8/2017 |
| EP | 1591469 | 11/2005 |

(Continued)

OTHER PUBLICATIONS

Brullo, "Fluoroelastomer Rubber for Automotive", Automotive Elastomer & Design, Jun. 1985, 4 pages.
Brullo, "Fluoroelastomer Seal Up Automotive Future", Materials Engineering, Oct. 1988, 5 pages.
Grootaert, "Fluorocarbon Elastomers" Kirk-Othmer, Encyclopedia of Chemical Technology 4th ed, 1993, vol. 8, pp. 990-1005.
International Search Report for PCT International Application No. PCT/IB2019/051150, dated May 16, 2019, 5 pages.

(Continued)

*Primary Examiner* — Nicole M. Buie-Hatcher

(57) ABSTRACT

A curable composition comprising a fluorinated amorphous fluoropolymer, and a blend of polysulfonamide and polyol crosslinking agents.

10 Claims, No Drawings

(56) References Cited

U.S. PATENT DOCUMENTS

2007/0049646 A1* 3/2007 Moore .................. C07C 43/178
516/201
2013/0068336 A1    3/2013 Kanbe
2013/0264041 A1   10/2013 Zhamu
2015/0024216 A1    1/2015 Uami

FOREIGN PATENT DOCUMENTS

GB         1521095       8/1978
WO     WO-0181464 A1 *  11/2001  ............ C08F 214/18
WO     WO 2019-159067    8/2019
WO     WO 2019-159070    8/2019

OTHER PUBLICATIONS

International Search Report for PCT International Application No. PCT/IB2019/051151, dated May 16, 2019, 4 pages.
International Search Report for PCT International Application No. PCT/IB2019/051154, dated May 16, 2019, 4 pages.

* cited by examiner

BLENDS OF CROSSLINKING AGENTS FOR FLUOROELASTOMERS

CROSS REFERENCE TO RELATED APPLICATIONS

This application is a national stage filing under 35 U.S.C. § 371 of PCT/IB2019/051150, filed Feb. 13, 2019, which claims the benefit of Provisional Application No. 62/632,013, filed Feb. 19, 2018, the disclosures of which are incorporated by reference in their entirety herein.

BACKGROUND

Fluoropolymers are a commercially important class of materials that include, for example, crosslinked and uncrosslinked fluorocarbon elastomers and semi-crystalline or glassy fluorocarbon plastics.

Fluorocarbon elastomers, particularly the copolymers of vinylidene fluoride with other ethylenically unsaturated halogenated and non-halogenated monomers, such as hexafluoropropene, have particular utility in high temperature applications, such as seals, gaskets, and linings. See, for example, R. A. Brullo, "Fluoroelastomer Rubber for Automotive Applications," *Automotive Elastomer & Design*, June 1985, "Fluoroelastomer fSeal Up Automotive Future," *Materials Engineering*, October 1988, and W. M. Grootaert, et al., "Fluorocarbon Elastomers," Kirk-Othmer, *Encyclopedia of Chemical Technology*, Vol. 8, pp. 990-1005 (4th ed., John Wiley & Sons, 1993).

SUMMARY

There is a desire to identify a novel curing system for partially fluorinated fluoropolymers. In one aspect, a curable partially fluorinated polymer composition is disclosed comprising:
  (i) a partially fluorinated fluoropolymer, wherein the partially fluorinated amorphous fluoropolymer comprises carbon-carbon double bonds or is capable of forming carbon-carbon double bonds along the partially fluorinated amorphous fluoropolymer; and
  (ii) a curing agent composition comprising a blend of fluorinated polyol compound (and salts thereof) and a bis-sulfonamide compound.

As used herein, "alkyl" and "alkylene" mean the monovalent and divalent residues remaining after removal of one and two hydrogen atoms, respectively, from a linear or branched chain hydrocarbon having 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl. and the like. Unless otherwise noted, alkyl groups may be mono- or polyvalent.

"fluorinated" refers to hydrocarbon compounds that have one or more C—H bonds replaced by C—F bonds;

"fluoroalkyl has essentially the meaning as "alkyl" except that one or more of the hydrogen atoms of the alkyl radical are replaced by fluorine atoms; e.g. partially fluorinated alkylene.

"fluoroalkylene has essentially the meaning as "alkylene" except that one or more of the hydrogen atoms of the alkyl radical are replaced by fluorine atoms.

"Perfluoroalkyl" has essentially the meaning as "alkyl" except that all or essentially all of the hydrogen atoms of the alkyl radical are replaced by fluorine atoms, e.g. perfluoropropyl, perfluorobutyl, perfluorooctyl, and the like.

"Perfluoroalkylene" has essentially the meaning as "alkylene" except that all or essentially all of the hydrogen atoms of the alkylene radical are replaced by fluorine atoms, e.g., perfluoropropylene, perfluorobutylene, perfluorooctylene, and the like.

Perfluoroether and perfluoropolyether refers to perfluoroalkyl or perfluoroalkylene where the perfluorinated carbon chain contains one or more ether oxygen atoms; e.g. $CF_3CF_2OCF_2CF_2$—, $CF_3CF_2O(CF_2CF_2O)_3CF_2CF_2$—, $C_3F_7O(CF(CF_3)CF_2O)_sCF(CF_3)CF_2$—, where s is (for example) from about 1 to about 50, and —$CF_2OCF_2$—, or —$[CF_2$—$CF_2$—$O]_r$—$[CF(CF_3)$—$CF_2$—$O]_s$—; wherein r and s are (for example) integers of 1 to 50.

DETAILED DESCRIPTION

In the present disclosure, it has been found that a partially fluorinated amorphous fluoropolymer can be cured with a blend of a polyol and a polysulfonamide compound.

Using the blend of fluorinated polyol and polysulfonamide, Applicants achieve a faster cure rate compared with polysulfonamide alone, better physical properties and compression set % compared with polysulfonamide, better processability without scorch issue (scorch time is tunable) compared with the polyol alone and better control of the physical properties and the values of compression set.

The amorphous fluoropolymers of the present disclosure are partially fluorinated polymers. As disclosed herein, an amorphous partially fluorinated polymer is a polymer comprising at least one carbon-hydrogen bond and at least one carbon-fluorine bond on the backbone of the polymer. In one embodiment, the amorphous partially fluorinated polymer is highly fluorinated, wherein at least 60, 70, 80, or even 90% of the polymer backbone comprises C—F bonds.

The amorphous fluoropolymer of the present disclosure also comprises carbon-carbon double bonds and/or is capable of forming carbon-carbon double bonds along the polymer chain. In one embodiment, the partially fluorinated amorphous fluoropolymer comprises carbon-carbon double bonds along the backbone of the partially fluorinated amorphous fluoropolymer or is capable of forming carbon-carbon double bonds along the backbone of the partially fluorinated amorphous fluoropolymer. In another embodiment, the partially fluorinated amorphous fluoropolymer comprises carbon-carbon double bonds or is capable of forming carbon-carbon double bonds in a pendent group off of the backbone of the partially fluorinated amorphous fluoropolymer.

The fluoropolymer capable of forming carbon-carbon double bonds means that the fluoropolymer contains units capable of forming double bonds. Such units include, for example, two adjacent carbons, along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a fluoride, an alkoxide, a hydroxide, a tosylate, a mesylate, an amine, an ammonium, a sulfide, a sulfonium, a sulfoxide, a sulfone, and combinations thereof. Those fluoropolymer capable of forming carbon-carbon bonds generally have the structure ~CH—CX~, where X is a leaving groups such that when treated with base will provide the requisite unsaturation. In many embodiments the polymer has ~CH—CF~ in the backbone, which may be dehydrofluorinated.

The amorphous fluoropolymer comprises a plurality of these groups (carbon-carbon double bonds or groups capable of forming double bonds) to result in a sufficient cure. Generally, this means at least 0.1, 0.5, 1, 2, or even 5 mol %; at most 7, 10, 15, or even 20 mole % (i.e., moles of these carbon-carbon double bonds or precursors thereof per mole of polymer).

In one embodiment, the amorphous partially fluorinated polymer is derived from at least one hydrogen containing monomer such as vinylidene fluoride.

In one embodiment, the amorphous fluoropolymer comprises adjacent copolymerized units of vinylidene fluoride (VDF) and hexafluoropropylene (HFP); copolymerized units of VDF (or tetrafluoroethylene) and a fluorinated comonomer capable of delivering an acidic hydrogen atom to the polymer backbone, such as trifluoroethylene; vinyl fluoride; 3,3,3-trifluoropropene-1; pentafluoropropene (e.g., 2-hydropentafluoropropylene and 1-hydropentafluoropropylene); 2,3,3,3-tetrafluoropropene; and combinations thereof.

In some embodiments, small amounts (e.g., less than 10, 5, 2, or even 1 wt %) of additional monomers may be added so long as the amorphous fluoropolymer is able to be cured using the curing agent disclosed herein.

In one embodiment, the amorphous fluoropolymer is additionally derived from a hydrogen containing monomer including: pentafluoropropylene (e.g., 2-hydropentafluoropropylene), propylene, ethylene, isobutylene, and combinations thereof. In one embodiment, the amorphous fluoropolymer is additionally derived from a perfluorinated monomer. Exemplary perfluorinated monomers include: hexafluoropropene; tetrafluoroethylene; chlorotrifluoroethylene; perfluoro(alkylvinyl ether) such as perfluoromethyl vinyl ether, $CF_2=CFOCF_2CF_2OCF_3$, $CF_2=CFOCF_2OCF_2CF_2CF_3$, $CF_2=CFOCF_2OCF_2CF_3$, $CF_2=CFOCF_2OCF_3$, and $CF_2=CFOCF_2OC_3F_7$, perfluoro(alkylallyl ether) such as perfluoromethyl allyl ether, perfluoro(alkyloxyallyl ether) such as perfluoro-4,8-dioxa-1-nonene (i.e., $CF_2=CFCF_2O(CF_2)_3OCF_3$, and combinations thereof.

Exemplary types of polymers include those comprising interpolymerized units derived from (i) vinylidene fluoride, tetrafluoroethylene, and propylene; (ii) vinylidene fluoride, tetrafluoroethylene, ethylene, and perfluoroalkyl vinyl ether, such as perfluoro(methyl vinyl ether); (iii) vinylidene fluoride with hexafluoropropylene; (iv) hexafluoropropylene, tetrafluoroethylene, and vinylidene fluoride; (v) hexafluoropropylene and vinylidene fluoride, (vi) vinylidene fluoride and perfluoroalkyl vinyl ether; (vii) vinylidene fluoride, tetrafluoroethylene, and perfluoroalkyl vinyl ether, (viii) vinylidene fluoride, perfluoroalkyl vinyl ether, hydropentafluoroethylene and optionally, tetrafluoroethylene; (ix) tetrafluoroethylene, propylene, and 3,3,3-trifluoropropene; (x) tetrafluoroethylene, and propylene; (xi) ethylene, tetrafluoroethylene, and perfluoroalkyl vinyl ether, and optionally 3,3,3-trifluoropropylene; (xii) vinylidene fluoride, tetrafluoroethylene, and perfluoroalkyl allyl ether, (xiii) vinylidene fluoride and perfluoroalkyl allyl ether; (xiv) ethylene, tetrafluoroethylene, and perfluoroalkyl vinyl ether, and optionally 3,3,3-trifluoropropylene; (xv) vinylidene fluoride, tetrafluoroethylene, and perfluoroalkyl allyl ether; (xvi) vinylidene fluoride and perfluoroalkyl allyl ether; (xvii) vinylidene fluoride, tetrafluoroethylene, and perfluoroalkyloxyallyl ether; (xviii) vinylidene fluoride and perfluoroalkyloxyallyl ether; (xiv) vinylidene fluoride, tetrafluoroethylene, and perfluoroalkyloxyallyl ether; (xv) vinylidene fluoride and perfluoroalkyloxyallyl ether; (xvi) chlorotrifluoroethylene and vinylidine fluoride; and combinations thereof.

Advantageously, by using the curing agent blend disclosed herein, the amorphous fluoropolymers of the present disclosure can be cured without the need for pendent bromine, iodine, or nitrile cure sites along the polymer backbone. Often, the iodine and bromine-containing cure site monomers, which are polymerized into the fluoropolymer and/or the chain ends, can be expensive. The amorphous fluoropolymer of the present disclosure is substantially free of I, Br, and nitrile groups, wherein the amorphous fluoropolymer comprises less than 0.1, 0.05, 0.01, or even 0.005 mole percent relative to the total polymer.

In one embodiment, the amorphous fluoropolymers of the present disclosure are non-grafted, meaning that they do not comprise pendant groups including vinyl, allyl, acrylate, amido, sulfonic acid salt, pyridine, carboxylic ester, carboxylic salt, hindered silanes that are aliphatic or aromatic tri-ethers or tri-esters. In one embodiment, the amorphous fluoropolymer does not comprise a monophenol graft.

The above described amorphous fluoropolymers may be blended with one or more additional crystalline fluoropolymers. With the instant curing compounds, the crystalline fluoropolymers may be cured into the matrix of the amorphous fluoropolymer Commercially available vinyl fluoride fluoropolymers include, for example, those marketed Commercially available vinylidene difluoride-containing fluoropolymers include, for example, those fluoropolymers having the trade designation "THV" (e.g., "THV 200", "THV 400", "THVG", "THV 610", or "THV 800") as marketed by 3M/Dyneon, St. Paul, Minn.; "KYNAR" (e.g., "KYNAR 740") as marketed by Atofina, Philadelphia, Pa.; "HYLAR" (e.g., "HYLAR 700") as marketed by Ausimont USA, Morristown, N.J.; and "FLUOREL" (e.g., "FLUOREL FC-2178") as marketed by 3M/3M/Dyneon.

Useful fluoropolymers also include copolymers of HFP, TFE, and VDF (i.e., THV). These polymers may have, for example, VDF monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Examples of commercially available THV polymers include those marketed by 3M/Dyneon, LLC under the trade designations "3M/DYNEON THV 2030G FLUOROTHERMOPLASTIC", "3M/DYNEON THV 220 FLUOROTHERMOPLASTIC", "3M/DYNEON THV 340C FLUOROTHERMOPLASTIC", "3M/DYNEON THV 415 FLUOROTHERMOPLASTIC", "3M/DYNEON THV 500A FLUOROTHERMOPLASTIC", "3M/DYNEON THV 610G FLUOROTHERMOPLASTIC", or "3M/DYNEON THV 810G FLUOROTHERMOPLASTIC".

Useful fluoropolymers also include copolymers of ethylene, TFE, and HFP. These polymers may have, for example, ethylene monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Such polymers are marketed, for example, under the trade designation "3M/DYNEON FLUOROTHERMOPLASTIC HTE" (e.g., "3M/DYNEON FLUOROTHERMOPLASTIC HTE X 1510" or "3M/DYNEON FLUOROTHERMO-PLASTIC HTE X 1705") by 3M/Dyneon LLC.

Useful fluoropolymers also include copolymers of tetrafluoroethylene and propylene (TFE/P). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers are commercially available, for example, under the trade designations "AFLAS" (e.g., "AFLAS TFE ELASTOMER FA 100H", "AFLAS TFE ELASTOMER FA 150C", "AFLAS TFE ELASTOMER FA 150L", or "AFLAS TFE ELASTOMER FA 150P") as marketed by 3M/Dyneon, LLC, or "VITON" (e.g., "VITON VTR-7480" or "VITON VTR-7512") as marketed by E.I. du Pont de Nemours & Company, Wilmington, Del.

Useful fluoropolymers also include copolymers of ethylene and TFE (i.e., "ETFE"). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers may be obtained commercially, for example, as marketed under the trade designations "3M/DYNEON FLUOROTHERMOPLASTIC ET 6210J", "3M/DYNEON FLUOROTHERMOPLASTIC ET 6235", or "3M/DYNEON FLUOROTHERMOPLASTIC ET 6240J" by 3M/Dyneon LLC.

VDF-containing fluoropolymers can be prepared using emulsion polymerization techniques as described, for example, in U.S. Pat. No. 4,338,237 (Sulzbach et al.) or U.S. Pat. No. 5,285,002 (Grootaert), or US 20060029812 (Jing et al.), the disclosures of which are incorporated herein by reference.

The curable composition comprises a crosslinking component comprising a blend of a polysulfonamide and a fluorinated polyol. The polysulfonamide compound of the crosslinking component is of the formula:

$R^2(NH-SO_2R^1)_x$, I where
$R^1$ is a non-fluorinated or fluorinated group,
$R^2$ is a partially fluorinated or non-fluorinated group, preferably at least one of W and $R^2$ is a fluorinated group, and
subscript x is 2 to 8.

In some embodiments $R^1$ is a perfluorinated group (designated as $R_f^1$), and $R^2$ is partially fluorinated (designated as $R_f^2$) or non-fluorinated (designated as $R_h^2$). By partially fluorinated, it is meant that the $R^2$ group contains at least one non-fluorinated carbon atoms between a fluorinated carbon and the nitrogen, e.g $-CF_2-CH_2-NH-$. Such embodiments may be represented as:

$R_h^2(NH-SO_2R_f^1)_x$,                 II, or $R_f^2(NH-SO_2R_f^1)_x$,                 III $R_f^2(NH-SO_2R_h^1)_x$,                 iv

In some embodiments both $R^1$ and $R^2$ are non-fluorinated and may be represented by the formula:

$R_h^2(NH-SO_2R_h^1)_x$,                 V where
$R_h^1$ is a non-fluorinated group; and
$R_h^2$ is a non-fluorinated group.

The $R_f^1$ groups can contain straight chain, branched chain, or cyclic monovalent fluorinated groups or any combination thereof. The $R_f^1$ groups can optionally contain one or more catenary oxygen atoms in the carbon-carbon chain so as to form a carbon-oxygen-carbon chain (i.e. a oxyalkylene group). Perfluorinated groups are generally preferred, but hydrogen or chlorine atoms can also be present as substituents, provided that no more than one atom of either is present for every two carbon atoms.

It is additionally preferred that any $R_f^1$ group contain at least about 40% fluorine by weight, more preferably at least about 50% fluorine by weight. The terminal portion of the monovalent $R_f^1$ group is generally perfluorinated, preferably containing at least three fluorine atoms, e.g., $CF_3-$, $CF_3CF_2-$, $CF_3CF_2CF_2-$, $(CF_3)_2N-$, $(CF_3)_2CF-$, $SF_5CF_2-$. In certain embodiments, monovalent perfluoroalkyl groups (i.e., those of the formula $C_nF_{2n+1}-$) are the preferred $R_f^1$ groups, with n=3 to 5 being more preferred and with n=4 being the most preferred.

In some embodiment the $R_f^1$ may comprise a perfluoroether or perfluoropolyether. Useful perfluoroether groups ($R_f^1$) correspond to the formula:

$$F-R_f^3-O-R_f^4-(R_f^5)_q- \qquad (V)$$

wherein
$R_f^3$ represents a perfluoroalkylene group,
$R_f^4$ represents a perfluoroalkyleneoxy group consisting of perfluoroalkyleneoxy groups having 1, 2, 3 or 4 carbon atoms or a mixture of such perfluoroalkyleneoxy groups, $R_f^5$ represents a perfluoroalkylene group and q is 0 or 1.

The perfluoroalkylene groups $R_f^3$ and $R_f^5$ in formula (IV) may be linear or branched and may comprise 1 to 10 carbon atoms, preferably 1 to 6 carbon atoms. A typical monovalent perfluoroalkyl group is $CF_3-CF_2-CF_2-$ and a typical divalent perfluoroalkylene is $-CF_2-CF_2-CF_2-$, $-CF_2-$ or $-CF(CF_3)-$. Examples of perfluoroalkyleneoxy groups $R_f^4$ include: $-CF_2-CF_2-O-$, $-CF(CF_3)-CF_2-O-$, $-CF_2-CF(CF_3)-O-$, $-CF_2-CF_2-CF_2-O-$, $-CF_2-O-$, $-CF(CF_3)-O-$, and $-CF_2-CF_2-CF_2-CF_2-O$, which may repeat, for example, from 3 to 30 times.

The perfluoroalkyleneoxy group $R_f^4$ may be comprised of the same perfluorooxyalkylene units or of a mixture of different perfluorooxyalkylene units. When the perfluorooxyalkylene group is composed of different perfluoroalkylene oxy units, they can be present in a random configuration, alternating configuration or they can be present as blocks. Typical examples of perfluorinated poly(oxyalkylene) groups include: $-[CF_2-CF_2-O]_r-$; $-[CF(CF_3)-CF_2-O]_s-$; $-[CF_2CF_2-O]_r-[CF_2O]_t-$, $-[CF_2CF_2CF_2CF_2-O]_u$ and $-[CF_2-CF_2-O]_r-[CF(CF_3)-CF_2-O]_s-$; wherein each of r, s, t and u each are integers of 1 to 50, preferably 2 to 25. A preferred perfluorooxyalkyl group that corresponds to formula (V) is $CF_3-CF_2-CF_2-O-[CF(CF_3)-CF_2O]_s-CF(CF_3)CF_2-$ wherein s is an integer of 1 to 50.

In some embodiments $R^1$ may non-fluorinated ($R_h^1$) and selected from monovalent (hetero)hydrocarbyl groups including aliphatic, cycloaliphatic, aromatic or alkyl-substituted aromatic having 2 to 30 carbon atoms and optionally zero to four catenary heteroatoms of oxygen, nitrogen or sulfur; i.e. a heterohydrocarbyl group.

In some embodiments $R^2$ may non-fluorinated ($R_h^2$) and selected from di- and polyvalent (hetero)hydrocarbyl groups including aliphatic, cycloaliphatic, aromatic or alkyl-substituted aromatic having 2 to 30 carbon atoms and optionally zero to four catenary heteroatoms of oxygen, nitrogen or sulfur; i.e. a heterohydrocarbyl group.

In some embodiments the $R^2$ group may be partially fluorinated and designated as $R_f^2$. The $R_f^2$ groups are di- or polyvalent and can contain straight chain, branched chain, or cyclic pendent polyvalent fluorinated groups or any combination thereof. The $R_f^2$ groups can optionally contain one or more catenary oxygen atoms in the carbon-carbon chain so as to form a carbon-oxygen-carbon chain (i.e. a oxyalkylene group).

The $R_f^2$ generally contains a perfluorinated portion and at least one non-fluorinated carbon on each terminus such as $R_f^6(-Y)_x-$, where $R_f^6$ represents a perfluoroalkylene or perfluoroether group, and Y is a hydrocarbyl group.

In some embodiments the R group may be a fluorinated alkylene group to produce compounds of the formula:

$$R_f^3(Y-NH-SO_2R^1)_x, \quad VI$$

where
$R_f^3$ represents a perfluoroalkylene group,
Y is a hydrocarbyl groups, including alkylene and arylene, and is preferably an alkylene of 2 or more carbons; and subscript x is 2 to 8.

The $R_f^2$ group may also be a fluorinated ether or fluorinated polyether group to produce compounds of the formula:

$$[F-R_f^3-O-R_f^4-(R_f^5)_q]-(Y-NH-SO_2R^1)_x, \quad VII$$

where
$[F-R_f^3-O-R_f^4-(R_f^5)_q]-$ has a valence of x from abstraction of two or more F atoms from any of the $R_f^3$, $R_f^4$, or $R_f^5$ groups, and
$R_f^3$, $R_f^4$, $R_f^5$, subscript q, Y and $R^1$ are as previously defined.

In some embodiments the polysulfonamides of Formula I may be prepared by reaction of a sulfonyl halide compound with a di- or polyamine:

$$R^1SO_2-X+R^2(NH_2)_x \rightarrow I,$$

where $R^1$ is a fluorinated or non-fluorinated group and may be designated as $R_h^1$ or $R_f^1$ supra;
where $R^2$ may be a partially fluorinated group ($R_f^2$) or a non-fluorinated groups ($R_h^2$) and is a non-polymeric organic group that has a valence of x, and x is two to eight.

In some embodiments $R^2$ may selected from mono- and polyvalent (hetero)hydrocarbyl groups including aliphatic, cycloaliphatic, aromatic or alkyl-substituted aromatic having 1 to 30 carbon atoms and optionally zero to four catenary heteroatoms of oxygen, nitrogen or sulfur.

In some embodiments the $R^2$ group may be fluorinated designated as $R_f^2$ as described supra. Such compounds may be prepared by sulfonylation of fluorinated amines or the general formula $R_f^6(Y-NH_2)_x$ described in U.S. Pat. No. 8,907,120 (Yang et al.), U.S. Pat. No. 2,691,043 (Hustad et al.) and US 20130264041 (Baran et al.).

Useful (hetero)hydrocarbyl amines of the formula $R^2(NH_2)_x$ include aliphatic and aromatic polyamines. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, Other useful di- or polyamines are 4,4'-methylene dianiline, 3,9-bis(3-aminopropyl)-2,4,8,10-tetraoxaspiro[5,5]undecane, and polyoxyethylenediamine. Many di- and polyamines, such as those just named, are available commercially, for example, those available from Huntsman Chemical, Houston, TX.

The curing agent should be used in quantities substantial enough to cause the amorphous fluoropolymer to cure, as indicated by a rise in torque on a moving die rheometer. For example, at least 0.5-20 parts of the crosslinking agent per 100 parts of the amorphous fluoropolymer is used. If too little curing agent is used, the amorphous fluoropolymer will not cure. For example, no more than 20, 15, 10, or even 8 millimoles of the curing agent per 100 parts of the amorphous fluoropolymer is used. If too much curing agent is used, the amorphous fluoropolymer can become brittle.

One or a blend of polysulfonamide compounds with Formula I may be used, including any combination of polysulfonamide compounds of Formulas II, II and IV.

In addition to the polysulfonamide compound, the crosslinking component of the curable composition further comprises a blend with a fluorinated polyol curing agent of the formula:

$$R_f^{10}-[(CH_2)_y-OH]_x, \quad VIII \text{ (and conjugate base thereof)}$$

where
$R_f^{10}$ represents a perfluoroalkylene or perfluoroether group of valence x,
subscript y is 1 to 8; and
subscript x is 2 to 4. It is preferred at when $R_f^{10}$ is a perfluoroalkylene, then the polysulfonamide is of the Formulas II-VII, and not of Formula II.

The $R_f^{10}$ perfluoroalkylene groups can contain straight chain, branched chain, or cyclic polyvalent perfluorinated groups in any combination and are of the general formula: $-C_nF_{2n}-$ for divalent groups, $-C_nF_{2n-1}-$ for trivalent groups, $-C_nF_{2n-2}-$ for tetravalent groups, etc. Divalent groups with n=3 to 8 being more preferred and with n=2 to 5 being the most preferred. The compounds of Formula I will include the corresponding salts, or conjugate bases.

Minor amounts of hydrogen or chlorine atoms can also be present as substituents, provided that no more than one atom of either is present for every two carbon atoms. Preferably the $R_f$ group is entirely perfluorinated.

The perfluoroalkylene groups may comprise 1 to 10 carbon atoms, preferably 2 to 6 carbon atoms. A typical divalent perfluoroalkylene is $-CF_2-CF_2-$, $-CF_2-CF_2-CF_2-$, $-CF(CF_3)-CF_2-$, $-CF_2-$, $-CF_2-CF_2-CF_2-CF_2-CF_2-$, cyclic $C_6F_{12}-$ or $-CF(CF_3)-$.

In some embodiments the $R_f^{10}$ group may be selected from perfluoroether groups: $[R_f^{13}-O-R_f^{14}-(R_f^{15})_q]-[(CH_2)_y-OH]_x$, where $[R_f^{13}-O-R_f^{14}-(R_f^{15})_q]$ has a valence of x from abstraction of two or more F atoms from any of the $R_f^{13}$, $R_f^{14}$, or $R_f^{15}$ groups,
$R_f^{13}$ represents a perfluoroalkylene group,
$R_f^{14}$ represents a perfluoroalkyleneoxy group,
$R_f^{15}$ represents a perfluoroalkylene group and q is 0 or 1
subscript y is 1 to 8; and
subscript x is 2 to 4.

Perfluorinated polyols of Formula VIII where subscript y=1, are obtained by reduction using sodium borohydride or lithium aluminum hydride of derivatives of the corresponding carboxylic acid derivatives $R_f$—$(COX)_x$ (where X is halide, OH, or OR where R=methyl or ethyl and subscript x is 2-8). using standard techniques. Perfluorinated alcohols of Formula VIII where y=2 can be prepared from reaction of the corresponding iodide with ethylene, followed by hydrolysis to the so-called telomer alcohol. The process is described in U.S. Pat. No. 5,491,261 (Haniff et al.), incorporated herein by reference Higher idomrtrsd may be prepared from the reaction of perfluoroiodo compounds with unsaturated alcohols, followed by reduction of the iodo adduct:

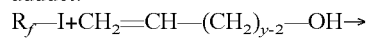

In some embodiments the fluorinated polyol may be the reaction product of the polyol of Formula VIII and a glycidyl compound:

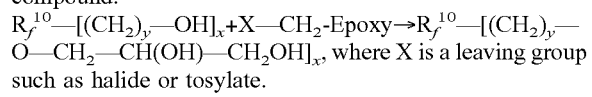
$CH_2$—$CH(OH)$—$CH_2OH]_x$, where X is a leaving group such as halide or tosylate.

Generally, the molar ratio of polysulfonamide groups of the polysulfonamide compound to hydroxy groups of the polyol is from 1:1 to 1:36.

The crosslinking component, comprising a blend of the polysulfonamide compound and the polyol compound, should be used in quantities substantial enough to cause the amorphous fluoropolymer to cure, as indicated by a rise in torque on a moving die rheometer. For example, at least 0.5-20 parts of the crosslinking agent per 100 parts of the amorphous fluoropolymer is used. If too little curing agent is used, the amorphous fluoropolymer will not cure. If too much curing agent is used, the amorphous fluoropolymer can become brittle. For example, no more than 20 millimoles of the curing agent per 100 parts of the amorphous fluoropolymer is used. One or a blend of polyol compounds with Formula VIII may be used in combination with the polysulfonamide.

In addition to the crosslinking component blend comprising the polysulfonamide compound and the polyol compound, the curable composition may optionally include an additional optional crosslinking agent. Examples of the optional crosslinking agent include polyol compounds, polythiol compounds, polyamine compounds, amidine compounds, bisaminophenol compounds, oxime compounds, and the like.

Generally, examples are not restricted for selecting the specific combination of the polysulfonamides of Formula I and secondary crosslinking agent and/or crosslinking promoter, depending on the type of polymer, but typical examples are presented below. For example, with a vinylidene fluoride system (binary system or ternary system), a polyol compound, polyamine compound, polythiophen compound is preferable. With a tetrafluoroethylene-propylene-vinylidene fluoride-based fluorine rubber (ternary) system, polyol compound, polyamine compound, polythiol compound, or the like is preferable.

Examples of preferable polyol compounds include 2,2-bis(4-hydroxyphenyl) hexafluoropropane, 4,4'-dihydroxy diphenyl sulfone, 4,4'-diisopropylidene diphenol, and the like.

Examples of preferable polythiol compounds include 2-dibutyl amino-4,6-dimercapto-s-triazine, 2,4,6-trimercapto-s-triazine, and the like.

Examples of preferable polyamine compounds include hexamethylene diamine carbamate, N,N'-dicinnamylidene-1,6-hexanediamine, 4,4'-methylene bis(cyclohexylamine) carbonate, and the like.

Examples of preferable amidine compounds include p-toluene sulfonate salts of 1,8-diazabicyclo[5.4.0]undec-7-ene, and the like.

Examples of preferable bisaminophenol compounds include 2,2-bis(3-amino-4-hydroxyphenyl))-hexafluoropropane, 2,2-bis[3-amino-4-(N-phenylamino)phenyl]hexafluoropropane, and the like.

In some embodiments, a combination of polyols of Formula I may be combined with a secondary fluorinated compounds of the Formula Z-Q-$R_f$—O—$(R_{fo})R_f$-Q-Z, as described in U.S. Pat. Nos. 5,384,374 and 5,266,650, Guerra et al, each incorporated herein by reference.

If using an optional second crosslinking agent, the molar ratios of the polyol curing agent of Formula I to the second crosslinking agent may be from 5:1 to 1:1.

The curable composition may further comprise an acid acceptor including organic, inorganic, or blends of thereof. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include amines, epoxies, sodium stearate, and magnesium oxalate. Particularly suitable acid acceptors include calcium hydroxide, magnesium oxide and zinc oxide. Blends of acid acceptors may be used as well. The amount of acid acceptor will generally depend on the nature of the acid acceptor used.

If the presence of an extractable metal compound is not desirable (such as semiconductor applications), the use of inorganic acid acceptors should be minimized, and these preferably should not be used at all. For example, a hardening composition with a formula that does not use an inorganic acid acceptor is particularly useful for sealing materials and gaskets for manufacturing semiconductor elements, sealing materials that are in contact with water, hot water, or the like, and sealing materials for high temperature areas such as automotive applications.

Examples of preferred acid acceptors that are commonly used include zinc oxide, calcium hydroxide, calcium carbonate, magnesium oxide, hydrotalcite, silicon dioxide (silica), lead oxide, and the like. These compounds are generally used in order to bond with HF and other acids. These acids are possibly produced at high temperatures that can be encountered during the hardening process when molding a molded article using the fluoropolymer composition, or at temperatures that demonstrate the function of fluoropolymers and the like.

In one embodiment, at least 0.5, 1, 2, 3, or even 4 parts of the acid acceptor per 100 parts of the amorphous fluoropolymer are used. In one embodiment, no more than 10, 7, or even 5 parts of the acid acceptor per 100 parts of the amorphous fluoropolymer are used.

The curable composition may further comprise an organo onium compound added to the composition as a phase transfer catalyst to assist with the crosslinking of the amorphous fluoropolymer and/or may be used to generate the double bonds on the fluoropolymer through dehydrofluorination. Such organo onium compounds include quaternary ammonium hydroxides or salts, quaternary phosphonium hydroxides or salts, and ternary sulfonium hydroxides or salts.

Briefly, a phosphonium and ammonium salts or compounds comprise a central atom of phosphorous or nitrogen, respectively, covalently bonded to four organic moieties by means of a carbon-phosphorous (or carbon-nitrogen) covalent bonds and is ionically associated with an anion. The organic moieties can be the same or different.

Briefly, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. The organic moieties can be the same or different. The sulfonium compounds may have more than one relatively positive sulfur atom, e.g. $[(C_6H_5)_2S^+(CH_2)_4S^+(C_6H_5)_2]_2Cl^-$, and two of the carbon-sulfur covalent bonds may be between the carbon atoms of a divalent organic moiety, i.e., the sulfur atom may be a heteroatom in a cyclic structure.

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed by Coggio et al. in U.S. Pat. No. 5,591,804.

Exemplary organoonium compounds include: $C_3$-$C_6$ symmetrical tetraalkylammonium salts, unsymmetrical tetraalkylammonium salts wherein the sum of alkyl carbons is between 8 and 24 and benzyltrialkylammonium salts wherein the sum of alkyl carbons is between 7 and 19 (for example tetrabutylammonium bromide, tetrabutylammonium chloride, benzyltributylammonium chloride, benzyltriethylammonium chloride, tetrabutylammonium hydrogen sulfate and tetrabutylammonium hydroxide, phenyltrimethylammonium chloride, tetrapentylammonium chloride, tetrapropylammonium bromide, tetrahexylammonim chloride, and tetraheptylammonium bromidetetramethylammonium chloride); quaternary phosphonium salts, such as tetrabutylphosphonium salts, tetraphenylphosphonium chloride, benzyltriphenylphosphonium chloride, tributylallylphosphonium chloride, tributylbenzyl phosphonium chloride, tributyl-2-methoxypropylphosphonium chloride, benzyldiphenyl(dimethylamino)phosphonium chloride, 8-benzyl-1,8-diazobicyclo[5.4.0]7-undecenium chloride, benzyltris(dimethylamino)phosphonium chloride, and bis(benzyldiphenylphosphine)iminium chloride. Other suitable organo onium compounds include 1,8-diazabicyclo[5.4.0]undec-7-ene and 1,5-diazabicyclo[4.3.0]non-5-ene. Phenolate is a preferred anion for the quaternary ammonium and phosphonium salts.

In one embodiment, the organo onium compound is used between 1 and 5 millimoles per 100 parts of the amorphous fluoropolymer (mmhr).

The fluoropolymer composition can also contain various additives in addition to the aforementioned components. Examples of additives include crosslinking auxiliary agents and/or crosslinking promoting auxiliary agents that combine favorably with the crosslinking agent and/or crosslinking promoter used, fillers (such as carbon black, flowers of zinc, silica, diatomaceous earth, silicate compounds (clay, talc, wollastonite, and the like), calcium carbonate, titanium oxide, sedimentary barium sulfate, aluminum oxide, mica, iron oxide, chromium oxide, fluoropolymer filler, and the like), plasticizers, lubricants (graphite, molybdenum disulfide, and the like), release agents (fatty acid esters, fatty acid amides, fatty acid metals, low molecular weight polyethylene, and the like), colorants (cyanine green and the like), and processing aids that are commonly used when compounding fluoropolymer compositions, and the like. However, these additives are preferably sufficiently stable under the intended conditions of use.

Furthermore, the carbon black can be used to achieve a balance between fluoropolymer composition properties such as tensile stress, tensile strength, elongation, hardness, wear resistance, conductivity, processability, and the like. Preferable examples include MT blacks under the product numbers N-991, N-990, N-908, and N-907 (medium thermal black); FEF N-550; and large diameter furnace black, and the like. If carbon black is used, the amount is preferably from approximately 0.1 to approximately 70 mass parts (phr) based on 100 mass parts of the total amount of polymer containing fluorinated olefin units and the additional polymer. This range is particularly preferable for the case where large particle furnace black is used The curable amorphous fluoropolymer compositions may be prepared by mixing the amorphous fluoropolymer, the curing agent, along with the other components (e.g., the acid acceptor, the onium compound, and/or additional additives) in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

Curing is typically achieved by heat-treating the curable amorphous fluoropolymer composition. The heat-treatment is carried out at an effective temperature and effective time to create a cured fluoroelastomer. Optimum conditions can be tested by examining the cured fluoroelastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

The partially fluorinated amorphous fluoropolymer in the curable composition has a Mooney viscosity in accordance with ASTM D1646-06 TYPE A by a MV 2000 instrument (available from Alpha Technologies, Ohio, USA) using large rotor (ML 1+10) at 121° C. Upon curing, using the curing agent disclosed herein, the amorphous fluoropolymer becomes an elastomer, becoming a non-flowing fluoropolymer, and having an infinite viscosity (and therefore no measurable Mooney viscosity).

The above curable compositions can be compounded or mixed in one or several steps, and then the mixture can be processed and shaped, for example, by extrusion (for example, in the form of a hose or hose lining) or molding (for example, in the form of an O-ring seal). The shaped article can then be heated to cure the composition and form a cured elastomer article.

In some embodiments the desired amounts of conventional additives adjuvants or ingredients are added to the uncured compostions and intimately admixed or compounded therewith by employing any of the usual rubber mixing devices such as Banbury mixers, roll mills, or any other convenient mixing device. The temperature of the mixture on the mill typically will not rise above about 120° C. During milling the components and adjuvants are distributed uniformly throughout the gum. The curing process typically comprises extrusion of the compounded mixture or pressing the compounded mixture in a mold, e.g., a cavity or a transfer mold, and subsequent oven-curing. Pressing of the compounded mixture (press cure) is usually conducted at a temperature between about 95 and about 230° C., preferably between about 150° C. and about 205° C. for a period of from 1 minute to 15 hours, typically from 5 minutes to 30 minutes. A pressure of between about 700 kPa and about 20,600 kPa is usually imposed on the compounded mixture in the mold. The molds first may be coated with a release agent, such as a silicone oil, and prebaked. The molded vulcanizate is then usually post-cured (oven-cured) at a temperature usually between about 150° C. and about 315° C. for a period of from about 2 hours to 50 hours or more depending on the cross-sectional thickness of the article.

The compositions of this invention can be used to form seals, O-rings and gaskets. The cured fluorocarbon elastomer mixture has excellent low-temperature flexibility while retaining the desired physical properties, for example tensile strength and elongation, of conventionally compounded and cured compositions. Particularly useful articles that can be fabricated from the fluorocarbon elastomer compositions of this invention are particularly useful as seals, gaskets, and molded parts in automotive, chemical processing, semiconductor, aerospace, and petroleum industry applications, among others.

EXAMPLES

All materials are commercially available, for example from Sigma-Aldrich Chemical Company, Milwaukee, WI, USA, or known to those skilled in the art, unless otherwise stated or apparent.

The following abbreviations are used in this section: g=grams, N m=newton meters, mm=millimeters, min=minutes, h=hours, phr=parts per hundred resin, MPa=megapascal ° C.=degrees Celsius. Abbreviations for materials used in this section, as well as descriptions of the materials, are provided in Table 1.

TABLE 1

| Material | Details |
|---|---|
| FC 2145 | A low-viscosity copolymer of hexafluoropropylene and vinylidene fluoride that does not include an incorporated curative, available under the trade designation "3M 3M/DYNEON FLUOROELASTOMER FC 2145" from 3M Company, Maplewood, MN, USA. |

TABLE 1-continued

| Material | Details |
|---|---|
| TPBPC | Triphenylbenzyl phosphonium chloride, available from Sigma-Aldrich Company, diluted to 50% by weight in methanol, also available from Sigma-Aldrich |
| C9 | CH3-Aromatic di-sulfonamide: $CH_3-Ph-SO_2-NH-C_6H_{12}-NH-SO_2-Ph-CH_3$, prepared as described in PE-1 below, except p-toluenesulfonyl chloride was replaced instead of methane sulfonyl chloride. |
| C11 | C4F9-Alkyl di-sulfonamide: $C_4F_9-SO_2-NH-C_8H_{16}-NH-SO_2-C_4F_9$, which can be prepared as described for Example 2 of U.S. Pat. No. 3,829,466. |
| C12 | CH3-Fluoroalkyl di-sulfonamide, $CH3-NH-SO_2-C_4F_8-SO_2-NH-CH_3$, prepared as described in Example 1 of U.S. Pat. No. 2,803,656, but with perfluorobutyldisulfonyl fluoride from 3M Company, Maplewood, MN, USA. and methyl amine available from Sigma-Aldrich Company. |
| C13 | C6-Alkyl di-sulfonamide, $CH_3-SO_2-NH-C_6H_{12}-NH-SO_2-CH_3$, prepared as described in PE-1below. |
| C17 | 1H,1H,8H,8H-Perfluoro-3,6-dioxaoctan-1,8-diol, $HO-CH_2-CF_2-O-CF_2CF_2-O-CF_2-CH_2-OH$, available from Exfluor Research Corp. Round Rock, TX, USA |
| Ca(OH)$_2$ | An acid acceptor. Calcium hydroxide commercially available under the trade designation "HALLSTAR CALCIUM HYDROXIDE HP-XL" from The Hallstar Company, Chicago, IL, USA |
| MgO | An acid acceptor. Magnesium oxide powder commercially available under the trade designation "ELASTOMAG 170" from Akrochem Corp., Akron, OH, USA |
| N990 | Carbon black, available under the trade designation "N990" from Cancarb, Medicine Hat, AB, CA |

Compounding 150 g batches of fluoropolymer were compounded with 0.78 parts per hundred (phr) of TPBPC, various amounts of curing agent as indicated in Table 2, 6 phr of Ca(OH)$_2$, 3 phr of MgO, and 20 phr of N990 carbon black, using a two-roll mill. Milling continued until a homogeneous blend formed. Ca(OH)$_2$, 3 phr of MgO, N990 were added as a mixture. When two co-agents were used, they were added as a blend. The ratios of each component in examples and comparative examples are indicated as phr in Table 2, below.

TABLE 2

| Example | CE-1 | CE-2 | CE-3 | CE-4 | CE-5 | CE-6 | EX-1 | EX-2 | EX-3 | EX-4 |
|---|---|---|---|---|---|---|---|---|---|---|
| FC 2145 (g) | 100 | 100 | 100 | 100 | 100 | 100 | 100 | 100 | 100 | 100 |
| TPBPC, phr | 0.78 | 0.78 | 0.78 | 0.78 | 0.78 | 0.78 | 0.78 | 0.78 | 0.78 | 0.78 |
| C9, phr | — | — | 2.55 | — | — | — | 0.85 | — | — | — |
| C11, phr | — | — | — | 4.25 | — | — | — | 1.42 | — | — |
| C12, phr | — | — | — | — | 2.33 | — | — | — | 0.78 | — |
| C13, phr | — | — | — | — | — | 1.63 | — | — | — | 0.54 |
| C17, phr | — | 1.76 | — | — | — | — | 1.76 | 1.76 | 1.76 | 1.76 |
| Bisphenol-AF, phr | 2.02 | — | — | — | — | — | — | — | — | — |
| Ca(OH)$_2$, phr | 6 | 6 | 6 | 6 | 6 | 6 | 6 | 6 | 6 | 6 |
| MgO, phr | 3 | 3 | 3 | 3 | 3 | 3 | 3 | 3 | 3 | 3 |
| N990, phr | 20 | 20 | 20 | 20 | 20 | 20 | 20 | 20 | 20 | 20 |

Cure Rheology

Cure rheology tests were carried out using uncured, compounded samples using a rheometer marketed under the trade designation PPA 2000 by Alpha technologies, Akron, OH, in accordance with ASTM D 5289-93a at 177° C., 12 minute elapsed time, and a 0.5 degree arc. The minimum torque ($M_L$), maximum torque ($M_H$), the time for the torque to reach a value equal to $M_L$+0.5 ($M_H$-$M_L$), (t'50), and the time for the torque to reach $M_L$+0.9 ($M_H$-$M_L$), (t'90), the scorch time (Ts2), and Tan delta at maximum torque were measured and their values are listed in Table 3.

Press-Cure Molding and Physical Property Test

The compound was press-cured using a mold (size: 75 mm×150 mm×2 mm or 150 mm×150 mm×2 mm) at 6.5×10$^3$ kPa and 177° C. for 10 min. Then the elastomer sheets were removed, cooled to room temperature, and then used for physical property test and post-cure. The dumbbell specimens were cutout from the sheets with ASTM Die D and subjected to physical property testing similar to the procedure disclosed in ASTM D412-06a (2013). The typical tensile strength deviation is +/−1.4 MPa (200 psi). The typical elongation deviation is +/−25%. Hardness is +/−2

The test results are summarized in Table 3.

Post-Cure and Physical Property Test

The press-cured elastomer sheet was post cured at 232° C. for 16 h in a circulating air oven. The samples were then removed from the oven, cooled to room temperature, and physical properties determined. The dumbbell specimens were cutout from the sheets with ASTM Die D and subjected to physical property testing similar to the procedure disclosed in ASTM D412-06a (2013). The test results are summarized in Table 3.

Heat-Aging and Physical Property Test

The dumbbell specimens of post cured samples were placed in a circulating air oven for 70 h at 270° C. The samples were then removed from the oven and cooled to room temperature for measurement of physical properties according to ASTM D412-06a. The test results are summarized in Table 3.

O-Ring Molding and Compression Set Test

O-rings having a cross-section thickness of 0.139 inch (3.5 mm) were molded at 6.5×10$^3$ kPa and 177° C. for 10 min and then post-cured at 232° C. for 16 h. The O-rings were subjected to compression set testing similar to the procedure disclosed in ASTM 395-89 method B, with 25% initial deflection. The typical deviation is +/−2-3% Results of compression test are reported in Table 3.

TABLE 3

Curable fluoropolymer curing characteristics, and properties of cured fluoropolymers

| | CE-1 | CE-2 | CE-3 | CE-4 | CE-5 | CE-6 | EX-1 | EX-2 | EX-3 | EX-4 |
|---|---|---|---|---|---|---|---|---|---|---|
| Curing Characteristics MDR, 0.5° @ 177° C. (350° F.) 12 minute motor | | | | | | | | | | |
| Minimum torque, ML, N · m | 0.06 | 0.59 | 0.16 | 0.21 | 0.08 | 0.13 | 0.44 | 0.08 | 0.11 | 0.40 |
| Maximum torque, MH, N · m | 1.79 | 0.80 | 0.39 | 0.96 | 1.03 | 0.39 | 0.93 | 1.39 | 1.69 | 0.97 |
| MH − ML, N · m | 1.73 | 0.20 | 0.24 | 0.34 | 0.95 | 0.26 | 0.48 | 1.31 | 1.59 | 0.57 |
| Ts2, min | 0.62 | * | 5.57 | 0.75 | 0.88 | 5.18 | 0.5 | 0.5 | 0.367 | 0.282 |
| t'50, min | 0.73 | 0.93 | 0.59 | 0.53 | 1.22 | 1.22 | 0.73 | 0.73 | 0.479 | 0.332 |
| t'90, min | 1.06 | 3.53 | 3.28 | 1.69 | 3.1 | 5.98 | 2.38 | 2.38 | 0.71 | 1.16 |

TABLE 3-continued

Curable fluoropolymer curing characteristics, and properties of cured fluoropolymers

| | Example or Counter Example Number | | | | | | | | | |
|---|---|---|---|---|---|---|---|---|---|---|
| | CE-1 | CE-2 | CE-3 | CE-4 | CE-5 | CE-6 | EX-1 | EX-2 | EX-3 | EX-4 |
| Tan delta at maximum torque | 0.042 | 0.094 | 0.276 | 0.160 | 0.086 | 0.336 | 0.052 | 0.052 | 0.041 | 0.092 |
| Properties of Cured Gumstocks Physical Properties, press cure 10 min @ 177° C. (350° F.) | | | | | | | | | | |
| Durometer, shore A | 66 | ** | ** | ** | 62 | ** | 62 | 63 | 66 | *** |
| Tensile, MPa | 10.24 | ** | ** | ** | 11.16 | ** | 11.42 | 10.91 | 10.96 | *** |
| Elongation, % | 239 | ** | ** | ** | 350 | ** | 294 | 312 | 277 | *** |
| 100% Modulus, MPa | 3.31 | ** | ** | ** | 2.14 | ** | 2.84 | 2.78 | 3.19 | *** |
| Physical Properties, post cure 16 hrs @ 232° C. (450° F.) | | | | | | | | | | |
| Durometer, shore A | 67 | ** | ** | ** | 67 | ** | 63 | 67 | 68 | 66 |
| Tensile, MPa | 14.05 | ** | ** | ** | 12.82 | ** | 13.04 | 15.30 | 14.72 | 12.22 |
| Elongation, % | 191 | ** | ** | ** | 275 | ** | 250 | 210 | 208 | 226 |
| 100% Modulus, MPa | 4.52 | ** | ** | ** | 3.33 | ** | 3.61 | 4.47 | 4.30 | 4.01 |
| Physical Properties, Air aged 70 hrs @ 270° C. (518° F.) | | | | | | | | | | |
| Durometer, shore A | 74 | ** | ** | ** | 89 | ** | 66 | 72 | 71 | *** |
| Tensile, MPa | 7.45 | ** | ** | ** | 7.76 | ** | 11.30 | 14.05 | 11.85 | *** |
| Elongation, % | 151 | ** | ** | ** | 54 | ** | 250 | 185 | 183 | *** |
| 100% Modulus, MPa | 4.50 | ** | ** | ** | * | ** | 3.49 | 6.02 | 4.58 | *** |
| Compression Set, 70 hrs @ 200° C. (392° F.) | | | | | | | | | | |
| Compression Set, % | 21.1 | ** | ** | ** | 61.7 | ** | 31.7 | 39.8 | 34.9 | *** |

\* not measurable.
\*\* did not form a good molded products due to a scorch.
\*\*\* not measured.

What is claimed is:

1. A curable composition comprising a partially fluorinated amorphous fluoropolymer, an acid acceptor; and a crosslinking component comprising a blend of a polysulfonamide compound and a fluorinated ether polyol compound, wherein the polysulfonamide is of the formula $R^2(NH-SO_2R_f^1)_x$, wherein $R_f^1$ is a perfluoroether group of the formula $F-R_f^3-O-R_f^4-(R_f^5)_q-$, wherein $R_f^3$ represents a perfluoroalkylene group, $R_f^4$ represents a perfluoroalkyleneoxy group, and $R_f^5$ represents a perfluoroalkylene group and q is 0 or 1, wherein $R^2$ is a partially fluorinated or non-fluorinated group, and subscript x is 2 to 8 wherein the curable composition optionally comprises an organo onium accelerator.

2. The curable composition of claim 1 wherein the partially fluorinated amorphous fluoropolymer comprises carbon-carbon double bonds or is capable of forming carbon-carbon double bonds along the amorphous fluoropolymer.

3. The curable composition of claim 1, wherein $R^2$ is a $C_2$-$C_{30}$ aliphatic, cycloaliphatic, aromatic or alkyl-substituted aromatic hydrocarbyl group of valence x designated as $R_h^2$.

4. The curable composition of claim 1 wherein $R^2$ is a fluorinated group of the formula $R_f^6(Y-)_x-$, where $R_f^6$ represents a perfluoroalkylene or perfluoroether group, and Y is a hydrocarbyl group.

5. The curable composition of claim 1 wherein the fluorinated ether polyol is of the formula:

$R_f^{10}-[(CH_2)_y-OH]_x$, and conjugate base thereof where $R_f^{10}$ represents a perfluoroether group of valence x, subscript y is 1 to 8; and subscript x is 2 to 4.

6. The curable composition of claim 1 wherein the fluorinated ether polyol is of the formula $[R_f^{13}-O-R_f^{14}-(R_f^{15})_q]-[(CH_2)_y-OH]_x$, where $[R_f^{13}-O-R_f^{14}-(R_f^{15})_q]$ has a valence of x from abstraction of two or more F atoms from any of the $R_f^{13}$, $R_f^{14}$, or $R_f^{15}$ groups, $R_f^{13}$ represents a perfluoroalkylene group, $R_f^{14}$ represents a perfluoroalkyleneoxy group, $R_f^{15}$ represents a perfluoroalkylene group and q is 0 or 1 subscript y is 1 to 8; and subscript x is 2 to 4.

7. A molded article comprising the cured compositions of claim 1.

8. A method of preparing a shaped article comprising the steps of:

providing the curable composition of claim 1, heating said composition to a temperature sufficient to cure the composition; and recovering the shaped article.

9. A curable composition comprising a partially fluorinated amorphous fluoropolymer,
an acid acceptor; and
a crosslinking component comprising a blend of a polysulfonamide compound and a fluorinated ether polyol compound,
wherein the polysulfonamide is of the formula:
$R_h^2(NH-SO_2R_f^1)_x$, where $R_f^1$ is a non-fluorinated or fluorinated group, $R^2$ is a partially fluorinated or non-fluorinated group,
subscript x is 2 to 8
$R_h^2$ is a (hetero)hydrocarbyl group, and $R_f^1$ is a perfluoroalkyl or perfluoroether group wherein the curable composition optionally comprises an organo onium accelerator.

10. The curable composition of claim 9 wherein $R_h^2$ is derived from a polyamine.

* * * * *

UNITED STATES PATENT AND TRADEMARK OFFICE
CERTIFICATE OF CORRECTION

| | | |
|---|---|---|
| PATENT NO. | : 11,919,984 B2 | Page 1 of 1 |
| APPLICATION NO. | : 16/969766 | |
| DATED | : March 5, 2024 | |
| INVENTOR(S) | : Jiyoung Park | |

It is certified that error appears in the above-identified patent and that said Letters Patent is hereby corrected as shown below:

In the Claims

Column 17
Line 53 (approx.), In Claim 1, insert --,-- before "wherein the curable composition optionally comprises an organo onium accelerator".

Column 19
Line 13, In Claim 9, insert --,-- before "wherein the curable composition optionally comprises an organo onium accelerator".

Signed and Sealed this
Twenty-sixth Day of November, 2024

Katherine Kelly Vidal
*Director of the United States Patent and Trademark Office*